(12) United States Patent
Nebel

(10) Patent No.: US 6,224,102 B1
(45) Date of Patent: May 1, 2001

(54) STABILIZING JACK FOR RECREATIONAL VEHICLES

(76) Inventor: Michael W. Nebel, Rte. 3, Box 6-A, Smith Center, KS (US) 66967

(*) Notice: Subject to any disclaimer, the term of this patent is extended or adjusted under 35 U.S.C. 154(b) by 0 days.

(21) Appl. No.: 09/315,187

(22) Filed: May 20, 1999

(51) Int. Cl.⁷ .................................................. B60S 9/02
(52) U.S. Cl. .................................. 280/765.1; 280/764.1; 254/424; 254/DIG. 2
(58) Field of Search ............................. 280/764.1, 763.1, 280/765.1, 766.1; 254/424, 419, 425, DIG. 2, 10 R

(56) References Cited

U.S. PATENT DOCUMENTS

| | | |
|---|---|---|
| 1,539,974 | 6/1925 | Tucker . |
| 2,747,836 | 5/1956 | Sherman . |
| 3,310,181 | 3/1967 | Symmank . |
| 3,345,038 | 10/1967 | Taylor . |
| 3,475,008 | 10/1969 | Taylor . |
| 3,565,396 | 2/1971 | Spear . |
| 3,767,226 | 10/1973 | Stephens . |
| 3,826,470 | 7/1974 | Spear . |
| 3,854,750 | 12/1974 | Voehringer, Jr. . |
| 3,870,276 | 3/1975 | Phillips . |
| 3,989,277 | 11/1976 | Stahl . |
| 4,103,869 | 8/1978 | Mesny et al. . |
| 4,146,250 | 3/1979 | DenHerder . |
| 4,148,461 | 4/1979 | Orth . |
| 4,515,520 * | 5/1985 | Parquet et al. ................ 280/765.2 X |
| 4,955,450 | 9/1990 | Deinlein-Kalb et al. . |
| 5,042,779 * | 8/1991 | Eden ..................................... 254/424 |
| 5,205,586 | 4/1993 | Tallman . |
| 5,348,330 | 9/1994 | Few et al. . |
| 5,488,788 | 2/1996 | Durbin . |
| 5,501,428 | 3/1996 | Garcea . |
| 5,547,220 | 8/1996 | Lagsdin . |
| 5,901,980 * | 5/1999 | Few et al. ........................ 280/763.1 |

* cited by examiner

Primary Examiner—J. J. Swann
Assistant Examiner—F. Zeender
(74) Attorney, Agent, or Firm—Shughart Thomson & Kilroy P.C.

(57) ABSTRACT

A stabilizing jack for vehicles comprises a pair of jack legs advanceable between retracted and extended positions by a single drive screw having left and right hand threaded sections which is mounted on a slide frame which is slidably mounted to and below a base frame. The base frame is securable to the frame of a vehicle such as a recreational vehicle for use in stabilizing the vehicle when parked. The drive screw has a screw follower or trunnion secured to each threaded section. Each leg is pivotally secured at a first end thereof to one of the screw followers. Struts or leg braces are pivotally connected at one end to each leg, medially thereof, and are pivotally connected at opposite ends to the base frame at the ends closest the respective leg. When the legs are extended or lowered on uneven ground, one leg will engage the ground before the other preventing that leg from further downward advancement but causing the drive assembly to drive the slide frame in an opposite direction while the other leg continues to advance downward until it engages the ground. Once both legs engage the ground, the balanced forces acting through the legs prevents the slide frame from sliding relative to the base frame such that the legs push downward on the ground with equal pressure, pushing upward on the mounting frame and raising the vehicle.

12 Claims, 3 Drawing Sheets

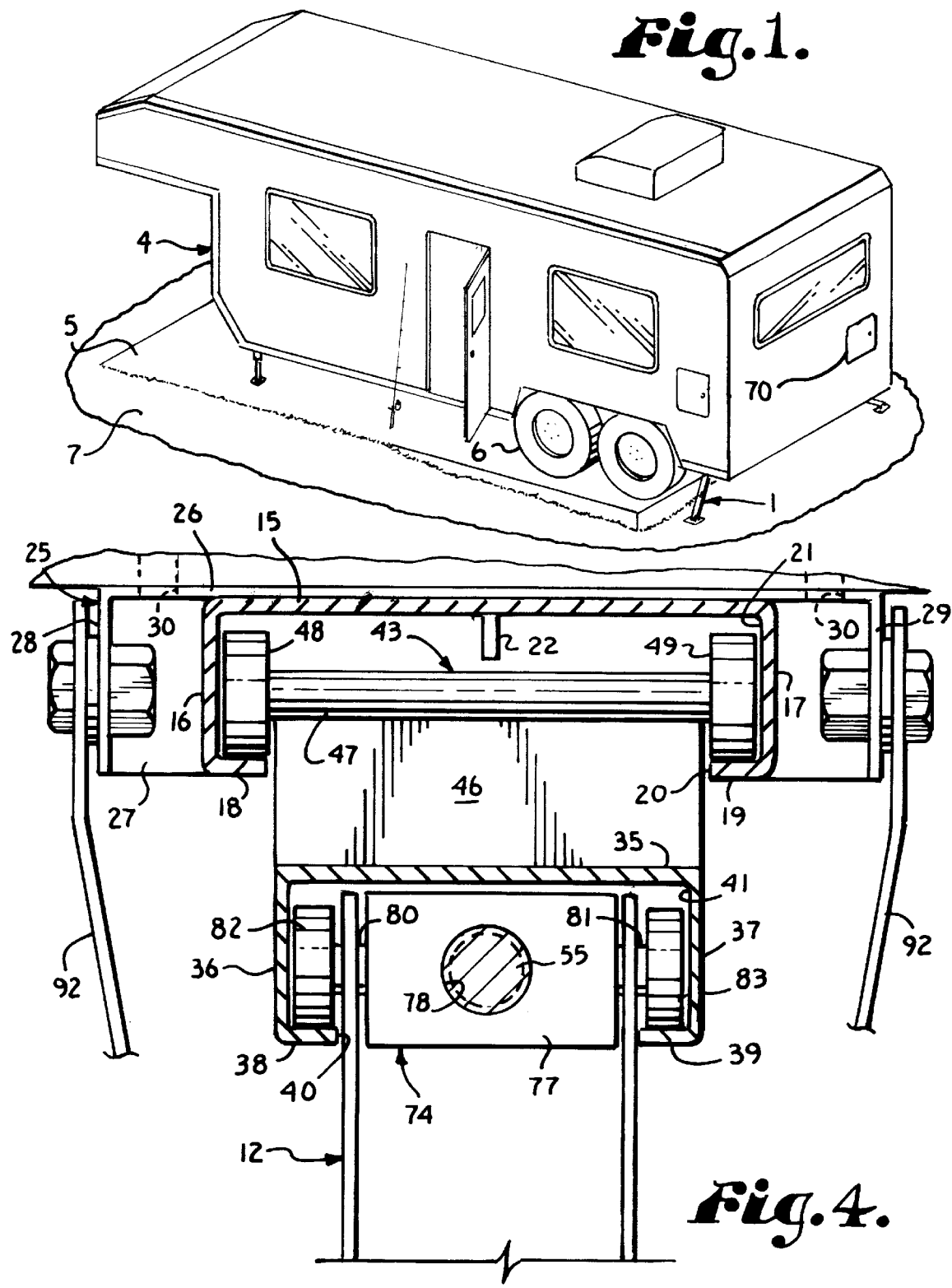

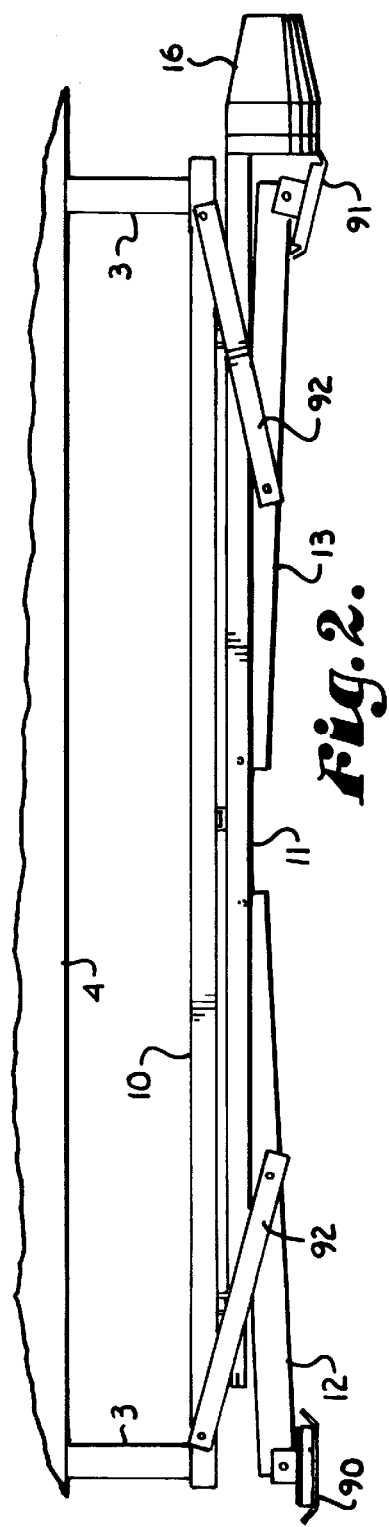
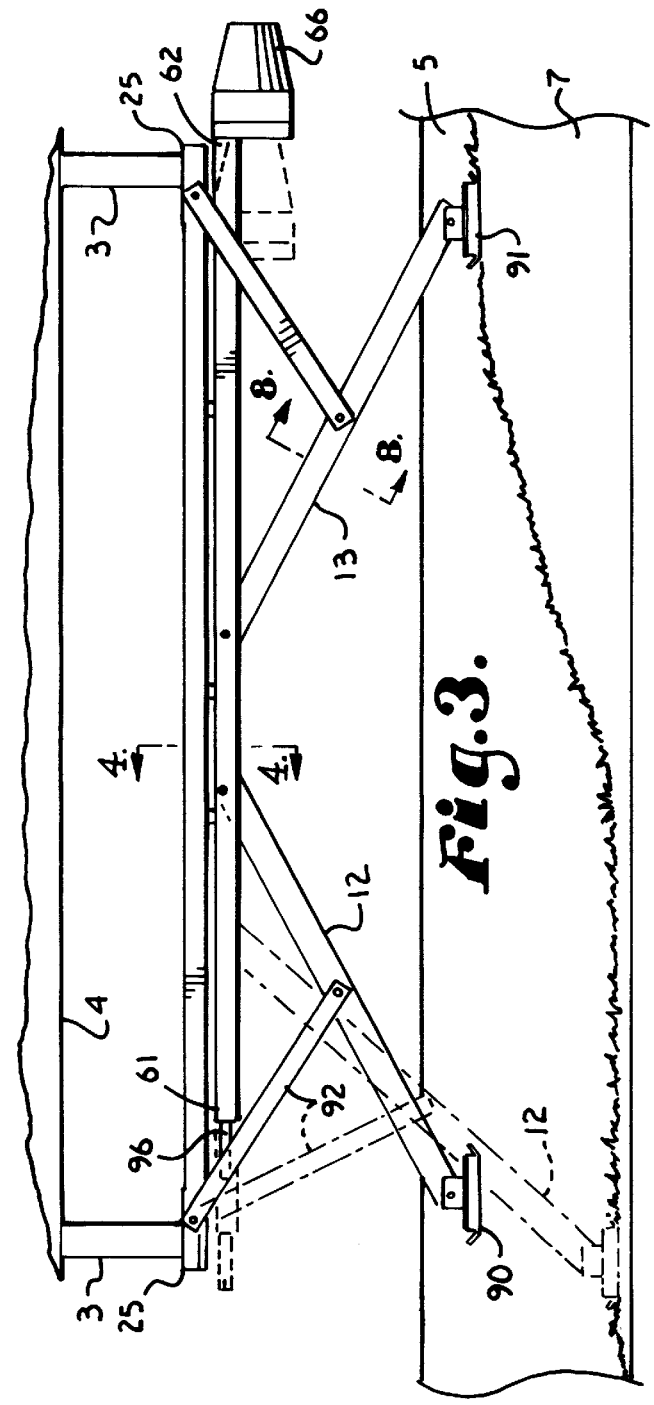

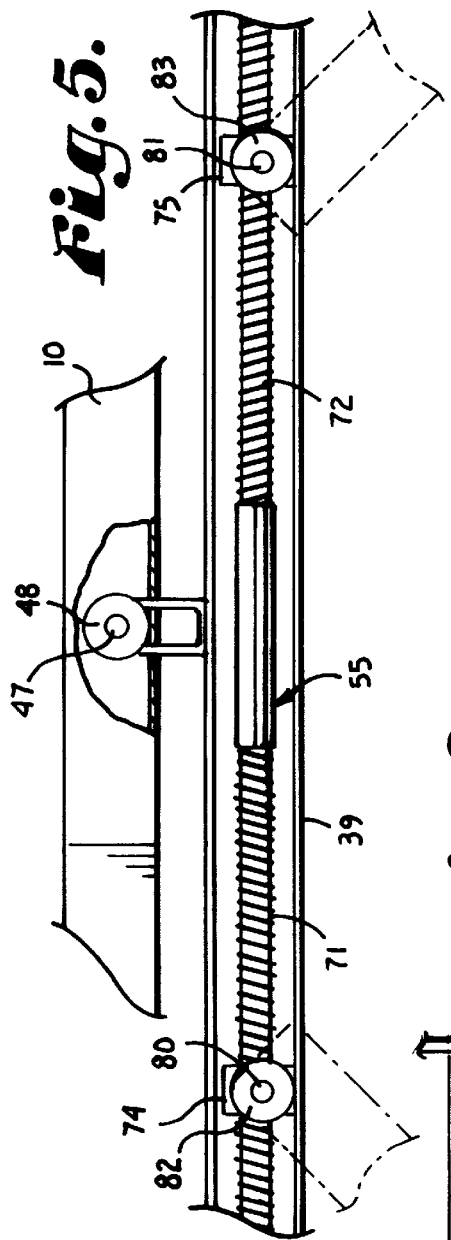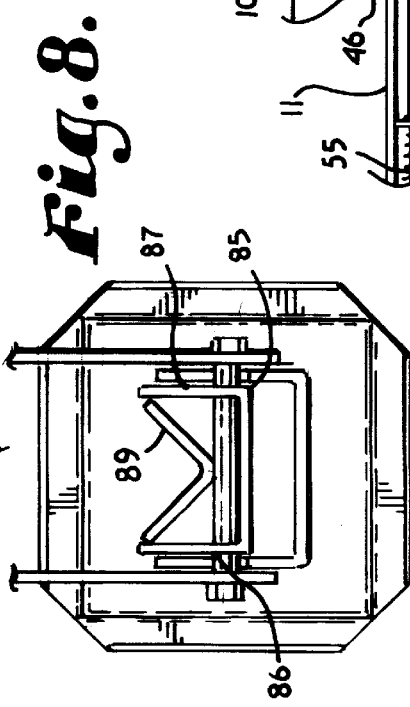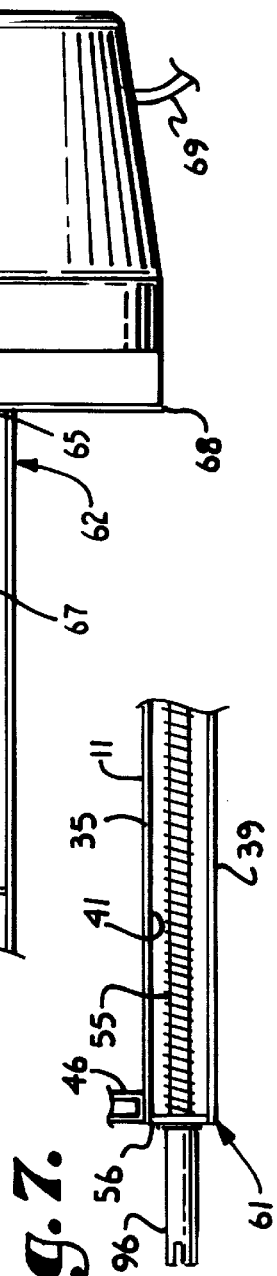

STABILIZING JACK FOR RECREATIONAL VEHICLES

BACKGROUND OF THE INVENTION

The present invention relates to stabilizing jacks for recreational vehicles adapted to raise the recreational vehicle relative to its suspension to provide stability to the vehicle when parked.

A wide variety of stabilizing jacks have been developed for use in stabilizing recreational vehicles, trailers and the like when parked by raising the vehicle relative to its suspension system to prevent rocking and swaying of the recreational vehicle as an occupant moves around in the vehicle. For example, U.S. Pat. No. 4,103,869 discloses a stabilizing system utilizing four separate jacks mounted in the corners of the vehicle with each jack having a separate gear motor for extending and retracting the leg of the jack. Raising and lowering of the jacks is controlled by an electronic switching system to selectively raise and lower one jack at a time to stabilize and level the vehicle.

Although stabilizing systems such as that shown in U.S. Pat. No. 4,103,869 do conveniently allow the user to raise and lower all four jacks from one location, the need for a separate motor for each jack leg significantly increases the cost of the stabilizing system. In addition, raising and lowering each jack leg independently makes it difficult to properly stabilize the vehicle. For example, with the leg of one of the rear jacks lowered into contact with the ground, as the leg of the other rear jack is lowered into contact with the ground to the point that it pushes upward on the vehicle body, it also lifts the opposite jack leg slightly off of the ground. Using such a system it is difficult to ever get all four jack legs touching the ground at the same time to provide the desired stability.

U.S. Pat. No. 3,870,276 discloses a stabilizing jack for recreational vehicles having a pair of jack legs which are raised and lowered using a single motor. The jack legs are mounted on a frame such that the legs are simultaneously moved downwardly into a stabilizing position beneath the vehicle with an equal force on both of the legs and such that both of the legs strike the ground before further force is applied to either leg to raise the vehicle, such as when the stabilizer is extended on uneven terrain. However, the usefulness of the stabilizing jack as shown in U.S. Pat. No. 3,870,276 is severely limited because the motor for each set of legs is mounted so as to extend downward from the vehicle. In this position, the motor and the stabilizing jack system are prone to damage during transport of the recreational vehicle because of clearance problems. In addition the configuration of the '276 patent limits the length of the legs such that the system may not be useable with current style coaches or trailers whose frames tend to sit higher off of the ground. The newer generation coaches sit higher off of the ground to accommodate slide out rooms and the like.

There remains a need for a relatively low cost stabilizing system which facilitates stabilizing of recreational vehicles and which may be driven by a motor.

SUMMARY OF THE INVENTION

The present invention comprises a stabilizing jack for vehicles having a pair of jack legs advanceable between retracted and extended or raised and lowered positions by a single drive assembly, wherein the drive assembly is mounted on a slide frame which is slidably mounted to and below a base frame. The base frame is securable to the frame of a vehicle such as a recreational vehicle to stabilize the vehicle when parked.

When the legs are lowered on uneven ground, one leg will engage the ground before the other preventing that leg from further downward advancement but causing the drive assembly to drive the slide frame in an opposite direction while the other leg continues to advance downward until it engages the ground. Once both legs engage the ground, the balanced forces acting through the legs prevents the slide frame from sliding relative to the base frame such that the legs push downward on the ground with equal pressure, pushing upward on the mounting frame and raising the vehicle.

In a preferred embodiment, the drive assembly comprises a drive screw having adjacent left and right hand threaded sections with a screw follower or trunnion secured to each threaded section. Each leg is pivotally secured at a first end thereof to one of the screw followers. Struts or leg braces are pivotally connected at one end to each leg, medially thereof, and are pivotally connected at opposite ends to the base frame at the ends closest the respective leg.

When the screw followers are positioned centrally relative to the drive screw or in close proximity to the transition between the left and right hand threaded sections, the legs are positioned in a retracted position relative to the slide frame and base frame. When the screw is rotated in a first direction, the screw followers advance outward relative to the screw, causing the legs to pivot downward or toward an extended position. When the screw is rotated in an opposite direction, the screw followers advance inward relative to the screw, causing the legs to pivot upward or toward the retracted position.

As the screw is rotated in the first direction and one leg engages the ground before the other, the engagement of that leg against the ground resists outward advancement of the screw follower attached to the leg at its upper end thereof relative to the ground, such that the screw and the slide frame advance in the opposite direction relative to the ground until the other leg touches the ground. Once both legs touch the ground the equal and opposite forces acting on the slide frame generally prevent it from sliding relative to the base frame and the screw followers are forced outward against the resistance thereon, causing the base frame to push upward on the vehicle raising it relative to its suspension system.

The drive screw is preferably driven by a motor connected to the drive screw at one end thereof. The motor is adapted to automatically shut off when the load thereon exceeds a selected amount, which occurs when the vehicle is raised sufficiently to stabilize the vehicle.

OBJECTS AND ADVANTAGES OF THE INVENTION

The objects of this invention include; providing a stabilizing jack having a pair of jack legs which may be extended and retracted using a single drive means or motor; to provide such a stabilizing jack which is adapted for use on uneven ground; to provide such a jack in which both legs engage the ground before exerting an upward force on a vehicle to which the jack is attached on an underside thereof; to provide such a jack which is relatively inexpensive to manufacture; and to provide such a jack which can be used to limit bouncing or rocking of a recreational vehicle when utilized therewith.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a recreational vehicle parked on a relatively level pad and having a stabilizing jack secured to a rear end thereof and deployed on uneven ground and supporting a rear end of the recreational vehicle.

FIG. 2 is an enlarged and fragmentary, rear elevational view showing the stabilizing jack of the present invention secured to frame members of the recreational vehicle with the stabilizing jack in a fully retracted position;

FIG. 3 is a view similar to FIG. 2 on a reduced scale and showing the stabilizing jack advancing to an extended position on uneven terrain;

FIG. 4 is an enlarged and fragmentary cross-sectional view taken along line 4—4 of FIG. 3.

FIG. 5 is an enlarged and fragmentary rear elevational view of the stabilizing jack as generally shown in FIG. 3 with portions broken away to show interior detail.

FIG. 6 is an enlarged and fragmentary rear elevational view of the right side of the stabilizing jack as generally shown in FIG. 3 with portions broken away to show interior detail.

FIG. 7 is an enlarged and fragmentary rear elevational view of the left side of the stabilizing jack as generally shown in FIG. 3 with portions broken away to show interior detail.

FIG. 8 is an enlarged and fragmentary cross-sectional view taken generally along line 8—8 of FIG. 3.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, and in particular FIGS. 1–3, the reference numeral 1 refers to a stabilizing jack of the present invention shown secured to frame members 3 of a recreational vehicle 4 parked on a pad 5. The recreational vehicle 4 is supported on a spring suspension system not shown connected to wheels 6. The suspension system is adapted to provide a smooth ride during travel. However, when the recreational vehicle 4 is parked, the suspension system allows the vehicle 4 to rock back and forth and bounce up and down relative to the wheels 6 as a passenger moves around in the vehicle 4.

The stabilizing jack 1 is adapted for raising the vehicle 4 upward relative to the wheels 6 to take some of the weight of the vehicle off of the suspension system to stabilize the vehicle 4 and prevent rocking and bouncing of the parked vehicle 4. For fifth wheel type recreational vehicles 4, as shown in FIG. 1, one stabilizing jack 1 is mounted across the rear end of the vehicle 4. In motor coach type recreational vehicles with an integral cab (not shown), a second stabilizing jack 1 is mounted across the front end of the vehicle 4. The stabilizing jack is not intended for use in leveling the recreational vehicle 4. The vehicle 4 is preferably parked on level ground such as a level pad 5 prior to stabilization. However, as shown in FIGS. 1 and 3, the ground 7 around the pad 5 on which the stabilizer jack 1 is to be supported, may not be level.

Referring to FIGS. 2–4, the stabilizing jack 1 comprises a channel-type mounting frame, base frame or member 10, a channel-type slide frame or member 11 slidably secured to and below the mounting frame 10, and first and second legs 12 and 13 connected to the slide frame 11 and advanceable between a retracted and extended orientation or a raised and lowered orientation relative thereto. As best seen in FIG. 4, the mounting frame 10 is formed from an elongated downwardly opening C-channel comprising a web 15, downwardly extending sidewalls 16 and 17, and inwardly extending track flanges 18 and 19 with a guide slot 20 extending therebetween and opening to an interior space or channel 21. A rib 22 is welded to and extends downward from the web 15 of mounting frame 10 into the channel 21.

A mounting bracket 25 is secured to each end of the mounting frame 10 for use in bolting the mounting frame 10 to the frame members 3 of the recreational vehicle 4. The mounting bracket 25 includes a top plate 26, downwardly extending end flange 27, and downwardly extending side flanges 28 and 29. The top plate 26 is wider than the web 15 of mounting frame 10. The mounting brackets 25 are welded to the mounting frame 10 on opposite ends thereof, such that the top plate 26 rests against the web 15 and the downwardly extending end flange 27 of each mounting bracket 25 abuts against a respective end of the mounting frame 10. Bolt holes 30 extend through the top plate 26 of each mounting bracket 25 on opposite sides of the mounting frame web 15. Corresponding holes are drilled into the frame members 3 of the recreational vehicle 4 to permit the stabilizing jack 1 to be bolted thereto.

The slide frame 11 is also formed from an elongated downwardly opening C-channel member comprising a web 35, downwardly extending sidewalls 36 and 37, and inwardly extending track flanges 38 and 39 with a guide slot 40 extending therebetween opening to an interior space or channel 41. In the embodiment shown, the slide frame 11 is narrower than the mounting frame 12 with the width of the slide frame 11 generally corresponding to the width of the mounting frame guide slot 20. It is foreseeable that the relative widths of the mounting frame 10 and slide frame 11 could be varied.

The slide frame 11 is slidably connected to the mounting frame 10 by three roller assemblies 43. Each roller assembly 43 comprises a base 46 formed from a length of square tubing welded to the upper surface of the web 35 of slide frame 11. An axle 47 is welded lengthwise to an upper surface of the base 46 and rollers 48 and 49 are rotatably mounted on opposite ends of the axle 47 beyond the ends of the base 46. The spacing of the rollers 48 and 49 corresponds to the spacing of the mounting frame track flanges 18 and 19 and the bases 46 of the roller assemblies 43 are narrower than the mounting frame guide slot 20. The axles 47 of roller assemblies 43 extend in closely spaced relation below the rib 22.

The slide frame 11 is slidably secured to the mounting frame 10 by sliding or rolling the rollers 48 and 49 onto the mounting frame track flanges 18 and 19 from one end of the mounting frame 10, through a notch, not shown, in the mounting bracket end flange 27, such that the bases 46 extend through the guide slot 20 and the slide frame 11 is supported below the mounting frame 10 with the rollers 48 and 49 supported on the mounting frame track flanges 18 and 19.

As best seen in FIGS. 5–7, a drive screw 55 is rotatably mounted lengthwise within the slide frame 11 on first and second bearing plates 56 and 57. Referring to FIGS. 6 and 7, the first bearing plate 56 extends across the channel 41 of slide frame 11 at a first end 61 thereof. The second bearing plate 57 extends across the channel 41 of slide frame 11 in inwardly spaced relation from a second end of the slide frame 11. The drive screw 55 is connected to and driven by a drive shaft 65 of motor 66 by linkage 67. The motor 66 is mounted on motor mounting plate 68 which is welded to the second end 62 of slide frame 11.

The motor 66 and the motor mounting plate 68 are mounted relative to the slide frame 11 such that the motor 66 extends completely below the mounting frame 10 such that the motor 66 may slide beneath the mounting frame 10 as the slide frame 11 slides relative to the mounting frame 10. The motor 66 is electrically connected by cord 69 to a battery and a switching system which permits reversible rotation of the drive screw 55. The switching system may be located in a wide variety of positions and is preferably located behind an access panel, such as access panel 70, on the outside of the vehicle 4 close to the stabilizer jack 1 to facilitate viewing of the stabilizing jack 1 when the first and second legs 12 and 13 are being raised and lowered.

The switching system is preferably of the type having a switch lever which is normally biased to an off position and which may be urged to a first switch position or condition generally marked as an extend position, in which a circuit connecting the motor 66 to the battery is closed causing the motor 66 to rotate the drive shaft 65 in a first direction causing the legs 12 and 13 to lower as discussed in more detail below. The switch lever may also be urged to a second switch position or condition generally marked as a retract position, in which the polarity of the connections between the battery and the motor 66 are reversed and closed causing the motor 66 to rotate the drive shaft 65 in an opposite direction causing the legs 12 and 13 to lower as discussed in more detail below.

The drive screw 55 includes a first threaded section 71 and a second threaded section 72 having right and left handed threads respectively. First and second trunnions 74 and 75 are threadingly secured to the first and second threaded sections 71 and 72 respectively of the drive screw 55. As best seen in FIG. 4, each trunnion 74 and 75 includes a base or block 77 with a threaded bore 78 extending therethrough for receiving the first or second threaded sections 71 or 72 of the drive screw 55. First and second axle pins 80 and 81 are press fit into a bore extending through the block 77 transverse to the threaded bore 78. The axle pins 80 and 81 are press fit into opposite sides of the block 77 and have first and second rollers 82 and 83 respectively mounted on outer ends thereof. The first and second rollers 82 and 83 are supported on the slide frame track flanges 38 and 39 respectively.

An upper end 86 of each leg 12 and 13 is pivotally mounted to trunnions 74 and 75 respectively. As best seen in FIG. 8, each leg 12 and 13 is formed from a U-shaped channel member 85 with upstanding sidewalls 86 and 87. The sidewalls 86 and 87 are pivotally supported on the axle pins 80 and 81 respectively which extend through bores in the sidewalls 86 and 87. The sidewalls 86 and 87 are supported on the axle pins 80 and 81 between the block 77 and the rollers 82 and 83 respectively. A reinforcing member 89 comprising a length of angle iron is welded into the U-shaped channel member 85 along approximately the lower two thirds thereof to strengthen the legs 12 and 13.

Feet 90 and 91 are pivotally secured to the distal ends of leg 12 and 13 respectively. A pair of struts or leg braces 92 are pivotally secured at first ends 93 thereof to each leg 12 and 13 generally medially thereof and on opposite sides. Second ends 94 of the struts are pivotally secured to the side flanges 28 and 29 of the mounting bracket 25 positioned closest thereto. Referring to FIG. 8, a manual crank fitting 96 is formed on or secured to the end of the drive screw 55 opposite the motor 66 for engagement by the end of a hand crank (not shown) to permit manual rotation of the drive screw 55 if electrical power is not available.

Operation

Referring to FIG. 2, the stabilizing jack 1 is shown in a fully retracted position, wherein the trunnions 74 and 75 are positioned proximate the center of the drive screw 55 or the transition between the left and right hand threaded sections 71 and 72 of the drive screw 55. In the retracted position, the legs 12 and 13 are generally pivoted upward in closely angled relation to the slide frame 11 due to the restraining nature of the struts 92, and the slide frame 11 is generally centrally supported relative to the mounting frame 10.

To lower the legs 12 and 13, an operator urges the switch lever to the extend position, activating the motor 66 and rotating the drive screw 55 in a first direction causing the first and second trunnions 74 and 75 to move outward, apart from one another along the opposingly threaded first and second threaded sections 71 and 72 of the drive screw 55. Outward advancement of the trunnions 74 and 75 causes the attached legs 12 and 13 respectively to pivot downward relative to slide frame 11 at the same rate with the slide frame 11 generally remaining stationary relative to mounting frame 10. If the foot of one leg, such as foot 91 of leg 13, engages the ground 7 first, due to uneven ground as generally shown in FIG. 3, the contact between the foot 91 and ground 7 generally provides resistance to further pivoting of leg 13 relative to slide frame 11 and therefore resists outward advancement of trunnion 75. Until the other foot, foot 90 of leg 12, engages the ground 7, further rotation of the drive screw 55 in the first direction causes the slide frame 11 to be driven or slide in the opposite direction as the outward path of travel of the trunnion 75. As shown by phantom lines in FIG. 3, the slide frame 11 slides to the left once foot 91 of leg 13 engages the ground 7 and until foot 90 of leg 12 engages the ground. As the slide frame 11 slides to the left, the trunnion 74, connected to leg 12 which has not yet touched the ground 7, continues to travel outward or to the left in FIG. 3, causing leg 12 to continue to pivot downward until the foot 90 on leg 12 touches the ground 7. Once the feet 90 and 91 of both legs 12 and 13 are advanced into contact with the ground 7, the contact between the legs 12 and 13 and the ground 7, generally prevents the slide frame 11 from sliding in either direction.

Continued rotation of the drive screw 55 in the first direction, once both legs 12 and 13 are in contact with the ground, then causes outward advancement of trunnions 74 and 75 causing the legs 12 and 13 to pivot downward at the same rate raising the vehicle 4 upward relative to its suspension system. The motor 66 is of a type which will automatically shut off when the load thereon exceeds a predetermined amount. In a preferred embodiment, the vehicle 4 will be raised approximately ¾ of an inch relative to its suspension system before the load on the motor 66 causes the motor 66 to automatically shut off.

Once both legs 12 and 13 are advanced into contact with the ground 7 and the jack 1 begins lifting upward on the vehicle 4, the blocks 77 of trunnions 74 and 75 will be pushed upward against an upper, inner surface of slide frame 11. The blocks 77 of trunnions 74 and 75 will continue to slide relative to the upper, inner surface of the slide frame 11, but the blocks 77 prevent bending of the drive screw 55 due to the forces acting thereon. Similarly the bases 46 and axles 47 of the roller assemblies 43 will be advanced upward against the rib 22. The frictional forces between the rib 22 and axles 47 resists sliding of the slide frame 11 relative to the mounting frame 10.

Once the vehicle 4 is raised slightly relative to its suspension and wheels 6, the vehicle is sufficiently stabilized to prevent rocking and bouncing as an occupant moves around in the vehicle 4. When the vehicle 4 needs to be moved. The operator urges the switch lever to a retract position which reverses the direction of rotation of the drive screw 55, causing the trunnions 74 and 75 to advance inward toward a center of the screw 55 (or the point of transition between the opposingly threaded sections 71 and 72) causing the legs to pivot upward to the retracted position.

It is to be understood that while certain forms of the present invention have been illustrated and described herein, it is not to be limited to the specific forms or arrangement of parts described and shown.

What is claimed and desired to be secured by Letters Patent is as follows:

1. A stabilizing jack for use with a vehicle comprising:
   (a) a stationary track securable to said vehicle;
   (b) a slide frame supported below said stationary track by a connector, a portion of said connector extends above and is supported on said stationary track and is slidable relative thereto such that said slide frame slides relative to said stationary track in parallel relation therebelow;
   (c) first and second linear actuators mounted to said slide frame below said stationary track; and
   (d) first and second legs pivotally mounted at first ends thereof to said first and second linear actuators respectively such that advancement of each of said first and second linear actuators between a first position and a second position pivots said first and second legs respectively between a retracted position and an extended position.

2. The stabilizing jack as in claim 1 further comprising:
   (a) a first strut pivotally connected at a first end to said first leg medially thereof and pivotally connected at a second end to said stationary track proximate a first end thereof; and
   (b) a second strut pivotally connected at a first end to said second leg medially thereof and pivotally connected at a second end to said stationary track proximate a second end thereof.

3. A stabilizing jack for use with a vehicle comprising:
   (a) a stationary track flange securable to said vehicle;
   (b) a slide frame supported below said stationary track flange by a connector, a portion of said connector extends above and is supported on said stationary track flange and is slidable relative thereto such that said slide frame slides relative to said stationary track flange in parallel relation therebelow;
   (c) a drive screw rotatably mounted to said slide frame and having a left hand threaded section and a right hand threaded section;
   (d) a first screw follower threadingly secured to said left hand threaded section of said drive screw and a second screw follower threadingly secured to said right hand threaded section of said drive screw; and
   (e) a first leg pivotally secured at a first end to said first screw follower and a second leg pivotally secured at a first end to said second screw follower.

4. The stabilizing jack as in claim 3 further comprising:
   (a) a first strut pivotally connected at a first end to said first leg medially thereof and pivotally connected at a second end to said stationary track flange proximate a first end thereof; and
   (b) a second strut pivotally connected at a first end to said second leg medially thereof and pivotally connected at a second end to said stationary track flange proximate a second end thereof.

5. The stabilizing jack as in claim 4 further comprising:
   (a) a reversible motor connected to said slide frame at a first end thereof and having a drive shaft connected to said drive screw for selectively rotating said drive screw clockwise and counterclockwise.

6. The stabilizing jack as in claim 5 further comprising:
   (a) a manual crank fitting secured to said drive screw on an end opposite said reversible motor and adapted for engagement by a hand crank for manually rotating said drive screw.

7. The stabilizing jack as in claim 3 wherein said drive screw is rotatably mounted on bearings fixedly secured to said slide frame such that said drive screw does not slide relative to said slide frame.

8. A stabilizing jack for use with a vehicle comprising:
   (a) a base frame securable to said vehicle, said base frame comprising a first elongated channel member including a web with first and second sidewalls depending therefrom and first and second track flanges extending inward from lower ends of said first and second sidewalls in spaced apart relation to form a first guide slot extending therebetween;
   (b) a slide frame slidably mounted to said base frame and extending therebelow, said slide frame comprises a second elongated channel member including a web with first and second sidewalls depending therefrom and first and second track flanges extending inward from lower ends of said first and second sidewalls in spaced apart relation to form a second guide slot extending therebetween;
   (c) at least two roller assemblies secured to said slide frame channel member in spaced apart relation and each including an axle connected to and extending above said slide frame channel member and a pair of rollers rotatably secured to said axle on opposite ends thereof; said rollers of said roller assemblies being rotatably supported on said first and second track flanges;
   (d) a drive screw rotatably mounted to said slide frame and having a left hand threaded section and a right hand threaded section;
   (e) a first screw follower threadingly secured to said left hand threaded section of said drive screw and a second screw follower threadingly secured to said right hand threaded section of said drive screw; and
   (f) a first leg pivotally secured at a first end to said first screw follower and a second leg pivotally secured at a first end to said second screw follower.

9. The stabilizing jack as in claim 8 further comprising:
   (a) a rib secured to and extending downward from an inner surface of said web of said first elongated channel member in closely spaced relation from an axle of at least one of said roller assemblies when said rollers are supported on said first and second track flanges and engaging said axle when said rollers are raised off of said first and second track flanges.

10. A stabilizing jack for use with a vehicle comprising:

(a) a stationary track member securable to said vehicle, said stationary track member comprising a first elongated channel member including a web with first and second sidewalls depending therefrom and first and second track flanges extending inward from lower ends of said first and second sidewalls in spaced apart relation to form a first guide slot extending therebetween;

(b) a sliding track member slidably secured to said stationary track member, said sliding track member comprising a second elongated channel member including a web with first and second sidewall depending therefrom and first and second track flanges extending inward from lower ends of said first and second sidewalls in spaced apart relation to form a second guide slot extending therebetween;

(c) first and second linear actuators mounted to said sliding track member; and (d) first and second legs pivotally mounted at first ends thereof to said first and second linear actuators respectively and extending through said second guide slot such that advancement of each of said first and second linear actuators between a first position and a second position pivots said first and second legs respectively between a retracted position and an extended position.

11. The stabilizing jack as in claim 10 wherein said first and second linear actuators comprise:

(a) a drive screw rotatably mounted to said sliding track member and having a left hand threaded section and a right hand threaded section;

(b) a first screw follower threadingly secured to said left hand threaded section of said drive screw and a second screw follower threadingly secured to said right hand threaded section of said drive screw; said first and second screw followers slidably mounted on said sliding track member; and (c) said first leg is pivotally secured at said first end to said first screw follower and said second leg is pivotally secured at said first end to said second screw follower.

12. The stabilizing jack as in claim 11 wherein said drive screw is rotatably mounted on bearings fixedly secured to said sliding track member such that said drive screw does not slide relative to said sliding track member.

* * * * *